US007869347B2

United States Patent
Bell et al.

(12) United States Patent
(10) Patent No.: US 7,869,347 B2
(45) Date of Patent: Jan. 11, 2011

(54) FUTILE NEIGHBOR STATE LOOP PREVENTION IN HIGH AVAILABILITY NETWORKS

(75) Inventors: Jon A. Bell, Raleigh, NC (US); Marc W. Price, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 118 days.

(21) Appl. No.: 12/142,519

(22) Filed: Jun. 19, 2008

(65) Prior Publication Data

US 2009/0316570 A1   Dec. 24, 2009

(51) Int. Cl.
*G06F 11/00* (2006.01)
(52) U.S. Cl. ............... 370/218; 370/238; 370/242
(58) Field of Classification Search ........... 370/238
See application file for complete search history.

(56) References Cited

U.S. PATENT DOCUMENTS 5,896,496 A * 4/1999 Suzuki ................ 714/48

2002/0054567 A1 * 5/2002 Fan .................... 370/230

* cited by examiner

*Primary Examiner*—Jason E Mattis
*Assistant Examiner*—Stephen J Clawson
(74) *Attorney, Agent, or Firm*—Scott D. Paul, Esq.; Carey Rodriguez Greenberg & Paul LLP

(57) ABSTRACT

A method for detecting and managing a futile neighbor state loop during link state routing is disclosed. The method can include reading a threshold parameter for link state routing, wherein the threshold parameter indicates a number of routing attempts, and performing link state routing to a node via a primary interface. The method can further include detecting a futile neighbor state loop during link state routing to the node via the primary interface by detecting a number of routing attempts that has reached the threshold parameter and detecting an available backup interface to the node. The method can further include suspending the primary interface to the node and switching routing to the backup interface.

17 Claims, 3 Drawing Sheets

FUTILE NEIGHBOR STATE LOOP PREVENTION IN HIGH AVAILABILITY NETWORKS

BACKGROUND OF THE INVENTION

1. Field of the Invention

The present invention relates to the field of network communications and more particularly to the use of routing protocols in network communications to increase availability of the network.

2. Description of the Related Art

An interior gateway protocol is a network routing protocol that is used within an autonomous system. The Open Shortest Path First (OSPF) protocol is a hierarchical interior gateway protocol for routing in Internet Protocol, using a link-state in the individual areas that make up the hierarchy. OSPF is performed by every switching node, i.e., router, in the network. Every node or router constructs a map of the connectivity of the network, in the form of a graph showing which nodes are connected to which other nodes. Each node then independently calculates the best next hop from it for every possible destination in the network. The collection of best next hops forms the routing table for the node.

During construction of the network map, a link state database is constructed as a tree-image of the network topology, and identical copies of the database are periodically updated on all routers in each area. Routers in the same broadcast domain or at each end of a point-to-point telecommunications link form adjacencies when they have detected each other. During detection, a router selects a designated router (DR) and a backup designated router (BDR) which act as a hub to reduce traffic between routers.

When OSPF is used by a dynamic routing application to maintain a partial map of the network and to report network link changes among the neighboring routers for routing recalculations, futile neighbor state loops can occur with designated routers during the neighbor adjacency formation processes. A futile neighbor state loop is a continuously repeating computing routine that does not achieve its intended task and has no auto shutoff. Futile neighbor state loops are usually caused by a problem in some remote hardware (e.g. router, switch, or network cable) that is beyond detection by the routing application and local hardware. When this problem occurs, the routing application is unable to complete adjacency formation with a designated router or a backup designated router based on the states defined in a neighbor finite state machine provided by the link state routing protocol. As a result, manual intervention of a system operator or network administrator is usually required for problem determination and resolution.

One approach to this problem used by some LAN environments in high availability networks incorporates the use of parallel multi-access interfaces for redundancy and availability. As allowed by the routing application, a backup parallel interface attached to the same LAN segment as the primary parallel interface can be used to attempt adjacency formation with the same designated router. However, if the parallel interfaces are defined to be in the same (sub)network and if the routing application has a restriction such that it allows only one of the interfaces to be used at a time for adjacency formation with a designated router, the problematic parallel interface has to be deactivated so that a backup designated router can be used for an adjacency formation attempt with the designated router. This requires the attention of an administrator to deactivate the problematic parallel interface and active the backup interface.

There are multiple neighbor states and events, based on the neighbor finite state machine, used for the adjacency formation process. Due to this fact, certain states and events must be identified to properly detect futile neighbor state loops. There is currently no automated process for collecting the appropriate data making this determination. Thus, it is difficult and time-consuming for an administrator to execute the procedure of detecting a problematic interface and switching to an available backup interface in configurations involving parallel interfaces.

Therefore, there is a need to overcome the deficiencies with the prior art and more particularly for a more efficient way to detect and correct for futile neighbor state loops in a high availability network.

BRIEF SUMMARY OF THE INVENTION

Embodiments of the present invention address deficiencies of the art in respect to routing and provide a novel and non-obvious method, system and computer program product for facilitating management of futile neighbor state loops during link state routing. In an embodiment of the invention, a method for detecting and managing a futile neighbor state loop during link state routing is disclosed. The method can include reading a threshold parameter for link state routing, wherein the threshold parameter indicates a number of routing attempts, and performing link state routing to a node via a primary interface. The method can further include detecting a futile neighbor state loop during link state routing to the node via the primary interface by detecting a number of routing attempts that has reached the threshold parameter and detecting an available backup interface to the node. The method can further include suspending the primary interface to the node and switching routing to the backup interface.

In another embodiment of the invention, a computer program product comprising a computer usable medium embodying computer usable program code for detecting and managing a futile neighbor state loop during link state routing can be provided. The computer program product can include computer usable program code for reading a threshold parameter for link state routing, wherein the threshold parameter indicates a number of routing attempts, and performing link state routing to a node via a primary interface. The computer program product can further include computer usable program code for detecting a futile neighbor state loop during link state routing to the node via the primary interface by detecting a number of routing attempts that has reached the threshold parameter and detecting an available backup interface to the node. The computer program product can further include computer usable program code for suspending the primary interface to the node and switching routing to the backup interface.

In another embodiment of the invention, an alternative method for detecting and managing a futile neighbor state loop during adjacency formation is disclosed. The method can include reading a threshold parameter for adjacency formation, wherein the threshold parameter indicates a pattern of link states, and performing adjacency formation with a node via a primary interface. The method can further include detecting a futile neighbor state loop during adjacency formation with the node via the primary interface by detecting the pattern of link states in the threshold parameter and detecting an available backup interface to the node. The method can further include suspending the primary interface to the node and switching routing to the backup interface.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention address deficiencies of the art in respect to routing and provide a novel and non-obvious method, system and computer program product for facilitating management of futile neighbor state loops during link state routing. In an embodiment of the invention, a method for detecting and managing a futile neighbor state loop during link state routing is disclosed. The method can include reading a threshold parameter for link state routing, wherein the threshold parameter indicates a number of routing attempts, and performing link state routing to a node via a primary interface. The method can further include detecting a futile neighbor state loop during link state routing to the node via the primary interface by detecting a number of routing attempts that has reached the threshold parameter and detecting an available backup interface to the node. The method can further include suspending the primary interface to the node and switching routing to the backup interface.

Figure 1:
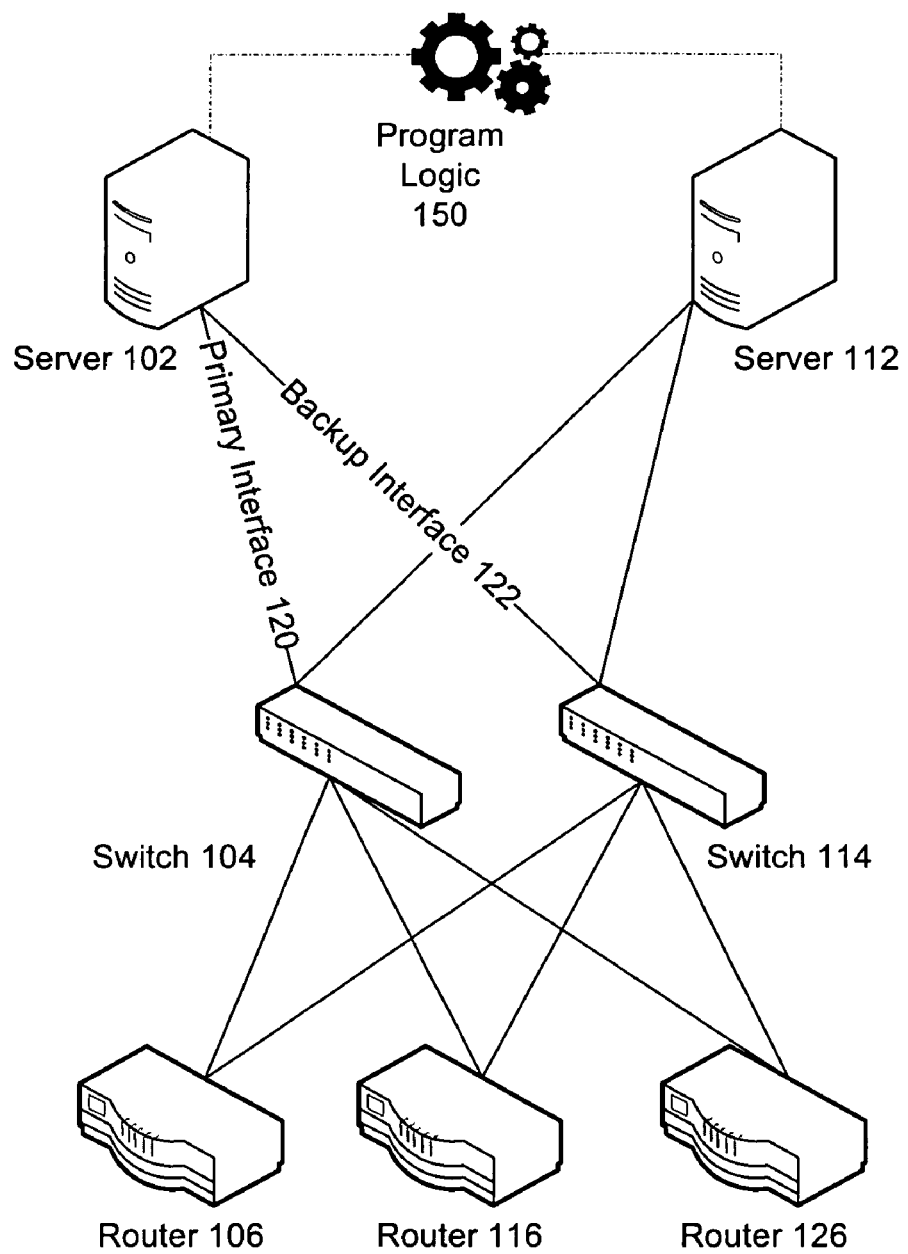
FIG. 1 is a block diagram illustrating a network architecture of a system for detecting and managing a futile neighbor state loop during link state routing, in accordance with one embodiment of the present invention.

Referring now to the drawing figures in which like reference designators refer to like elements, there is shown in FIG. 1 a block diagram illustrating a network architecture of a system for detecting and managing a futile neighbor state loop during link state routing, in accordance with one embodiment of the present invention. The exemplary embodiments of the present invention adhere to the system architecture of FIG. 1.

FIG. 1 shows a high availability network configuration including routers 106, 116 and 126. A router is a computer with software and hardware tailored to the tasks of routing and forwarding information. A router contains an operating system, RAM and one or more processors. Each router 106, 116 and 126 is separately connected to switches (or network switches) 104 and 114. A network switch is a computer networking device that connects network segments. Similarly, each switch 104, 114 is separately connected to servers 102, 112. FIG. 1 further shows a primary interface 120 connecting server 102 to the switch 104 and a backup interface 122 connecting the server 102 to the switch 114.

FIG. 1 shows a system whereby an application, represented by program logic 150, running on any one or both of servers 102, 112 automatically detects and mages futile neighbor state loops during the adjacency formation process of link state routing. Program logic 150 comprises computer source code, scripting language code or interpreted language code that is compiled to produce computer instructions that perform various functions of the present invention.

It should be noted that although FIG. 1 shows only two servers 102, 112, two switches 104, 114 and three routers 106, 116 and 126, the system of the present invention supports any number of servers, switches and routers. Further, although switches 104, 114 and routers 106, 116 and 126 are shown as separate entities, the present invention supports an architecture whereby a switch and router are integrated, such as in a layer three switch.

In an embodiment of the present invention, the computer systems of servers 102, 112 are one or more Personal Computers (PCs), Personal Digital Assistants (PDAs), hand held computers, palm top computers, lap top computers, smart phones, game consoles or any other information processing devices. A PC can be one or more IBM or compatible PC workstations running a Microsoft Windows or LINUX operating system, one or more Macintosh computers running a Mac OS operating system, or an equivalent. In another embodiment, the computer systems of servers 102, 112 are a server system, such as IBM RS/6000 workstations and servers running the AIX operating system.

Figure 2:
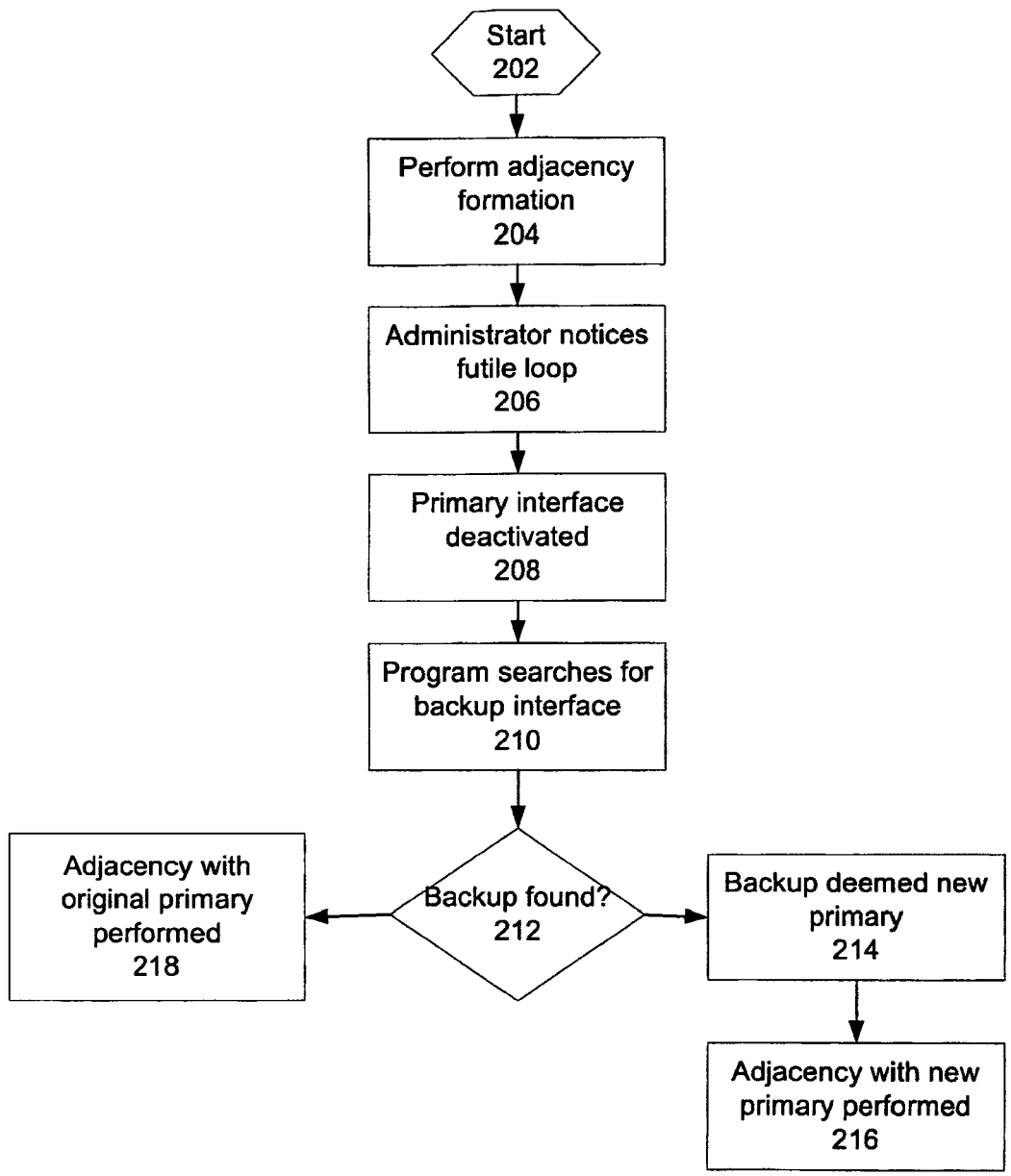
FIG. 2 is a flow chart showing the control flow of a prior art process for detecting and managing a futile neighbor state loop during link state routing.

FIG. 2 is a flow chart showing the control flow of a prior art process for detecting and managing a futile neighbor state loop during link state routing. FIG. 2 depicts the prior art process by which futile neighbor state loops are detected and managed. The control flow of FIG. 2 shall refer to FIG. 1 insofar as FIG. 1 represents a network architecture of the prior art (not including computer logic 150). The flow chart of FIG. 2 begins with step 202 and moves directly to step 204.

In step 204, as part of the OSPF link state routing protocol, the adjacency formation process is performed between the server 102 and node, or router, 106 as designated router via the primary interface 120. During the adjacency formation process, the link state of the node is received. Typically, a normal set of link states received from a node during adjacency formation include: 1 (Down), 2 (Attempt), 4 (Init), 8 (2-Way), 16 (ExStart), 32 (Exchange), 64 (Loading) and 128 (Full). Link states for a node that indicate a failure of the adjacency process include: 7 (SeqNumMismatch), 8 (BadLSA), 12 (NoHelloSeen), 15 (NoProgress). A futile neighbor state loop may be indicated by reception of successive repetitive patterns of link states, such as repetitive reception of link states 8 and 16.

In step 206, a futile neighbor state loop is in process and an administrator notices this process. In step 208, the administrator deactivates the primary interface 120. In step 210, the link state routing program, such as OMPROUTE, searches for an available backup interface. In step 212, it is determined whether the link state routing program found an available backup interface. If the link state routing program found an available backup interface, control flows to step 214. If not, control flows to step 218.

In step 214, the link state routing program found available backup interface 122 and therefore the link state routing program deems the backup interface 122 as the new primary interface and switches to backup interface 122. In step 216, adjacency formation between server 102 and router 106 is performed over the backup interface 122. In step 218, adjacency formation between server 102 and router 106 is again attempted over the primary interface 120.

Figure 3:
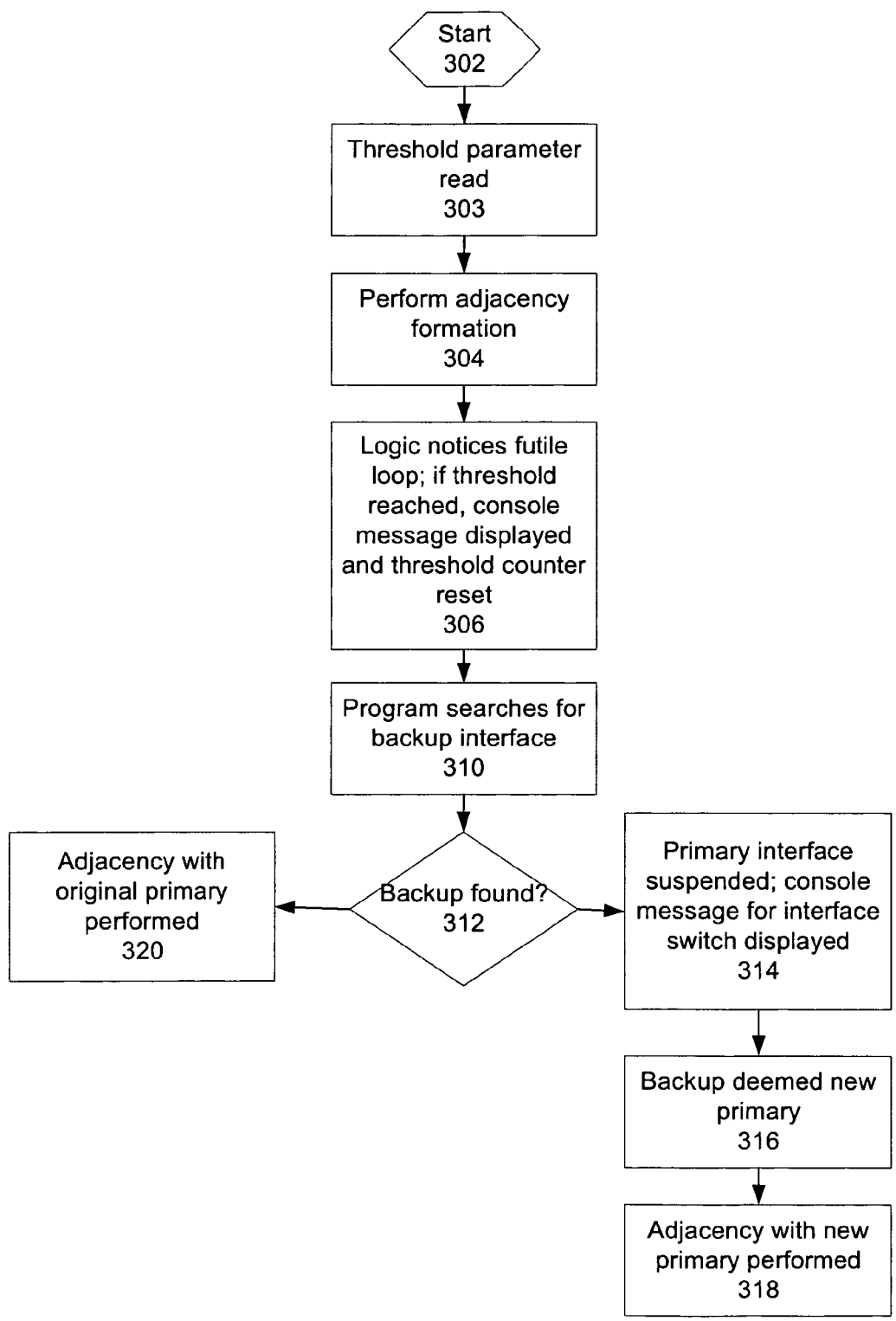
FIG. 3 is a flow chart showing the control flow of a process for detecting and managing a futile neighbor state loop during link state routing, in accordance with one embodiment of the present invention.

FIG. 3 is a flow chart showing the control flow of a process for detecting and managing a futile neighbor state loop during link state routing, in accordance with one embodiment of the present invention. FIG. 3 depicts the automated process executed by program logic 150 residing on server 102 during link state routing. Specifically, FIG. 3 depicts the process by which a futile neighbor state loop is detected and managed by program logic 150 during link state routing. The flow chart of FIG. 3 begins with step 302 and moves directly to step 303.

In step 303, a threshold parameter for adjacency formation is read. The threshold parameter may be a number representing a number of attempts at adjacency formation. Alternatively, the threshold parameter may comprise a pattern of link states. In another alternative, the threshold parameter may comprise a combination of a number of attempts at adjacency formation and a pattern of link states. In one embodiment, the parameter DR_MAX_ADJ_ATT in the OMPROUTE program is used to encapsulate the threshold parameter.

In step 304, as part of the OSPF link state routing protocol, the adjacency formation process is performed between the server 102 and node, or router, 106 as designated router via the primary interface 120. In step 306, a futile neighbor state loop is in process and program logic 150 notices this process. Program logic 150 may notice the futile neighbor state loop by: 1) noticing that the number of attempts at adjacency formation has reached the threshold parameter by using a counter that is incremented for each attempt and/or 2) noticing that the link states received from the router 106 match the pattern of link states of the threshold parameter. If program logic 150 notices the futile neighbor state loop by noticing that the counter has reached the threshold parameter, then in step 306, the counter is reset. Also in step 306, a console or dialog box message may be displayed on the screen of a user or administrator, which console or dialog box indicates the identity of the interface that is currently exhibiting a futile neighbor state loop.

In step 310, the link state routing program, such as OMPROUTE, searches for an available backup interface. In step 312, it is determined whether the link state routing program found an available backup interface. If the link state routing program found an available backup interface, control flows to step 314. If not, control flows to step 320.

In step 314, the link state routing program found available backup interface 122 and therefore the link state routing program suspends the primary interface 120. When an interface becomes suspended, the routing traffic stops flowing through the interface but traffic of information through other interfaces is not affected. Also in step 314, a console or dialog box message may be displayed on the screen of a user or administrator, which console or dialog box indicates the identity of the interface that is suspended and the identity of the backup interface.

Next, in step 316, the link state routing program deems the backup interface 122 as the new primary interface and switches to backup interface 122. In step 318, adjacency formation between server 102 and router 106 is performed over the backup interface 122. In step 320, adjacency formation between server 102 and router 106 is again attempted over the primary interface 120. Going forward, the process of the control flow of FIG. 3 may be further executed upon the new primary interface (formerly backup interface 122) so as to detect a futile neighbor state loop in the new primary interface.

As explained above, the present invention is advantageous since it allows for the automated detection of a futile neighbor state loop using a threshold parameter which may be modified to reflect certain desired thresholds. The present invention is further advantageous as it allows for the automated switching of the primary interface from a first, troubled interface to a second, available backup interface without the need for the intervention of a human administrator. Additionally, the present invention allows for notification to a user or administrator of the network through the use of console messages that indicate when a futile neighbor state loop has been detected, the identity of the problem interface and when a primary interface has been switched to a backup interface.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

I claim:

1. A method for detecting and managing a futile neighbor state loop during link state routing, comprising:

reading a threshold parameter for link state routing, wherein the threshold parameter indicates a number of routing attempts;

performing link state routing to a node via a primary interface;

detecting a futile neighbor state loop during link state routing to the node via the primary interface by detecting a number of routing attempts that has reached the threshold parameter;

detecting an available backup interface to the node;
suspending the primary interface to the node; and
switching routing to the backup interface, wherein the threshold parameter further indicates a pattern of link states.

2. The method of claim 1, wherein the futile neighbor state loop is detected by detecting a number of routing attempts that has reached the threshold parameter and by detecting a pattern of link states.

3. The method of claim 2, further comprising:
displaying a message indicating that a futile neighbor state loop has been detected in the primary interface to the node.

4. The method of claim 3, further comprising:
displaying a message indicating that an available backup interface to the node has been detected.

5. A computer program product, comprising a computer-readable storage-medium having stored therein computer usable program code for detecting and managing a futile neighbor state loop during link state routing, the computer usable program code, which when executed by a computer hardware system, causing the computer hardware system to perform:
reading a threshold parameter for link state routing, wherein the threshold parameter indicates a number of routing attempts;
performing link state routing to a node via a primary interface;
detecting a futile neighbor state loop during link state routing to the node via the primary interface by detecting a number of routing attempts that has reached the threshold parameter;
detecting an available backup interface to the node;
suspending the primary interface to the node; and
switching routing to the backup interface, wherein the threshold parameter further indicates a pattern of link states.

6. The computer program product of claim 5, wherein the futile neighbor state loop is detected by detecting a number of routing attempts that has reached the threshold parameter and by detecting a pattern of link states.

7. The computer program product of claim 6, further comprising:
displaying a message indicating that a futile neighbor state loop has been detected in the primary interface to the node.

8. The computer program product of claim 7, further comprising:
displaying a message indicating that an available backup interface to the node has been detected.

9. A method for detecting and managing a futile neighbor state loop during adjacency formation, comprising:
reading a threshold parameter for adjacency formation, wherein the threshold parameter indicates a pattern of link states;
performing adjacency formation with a node via a primary interface;
detecting a futile neighbor state loop during adjacency formation with the node via the primary interface by detecting the pattern of link states in the threshold parameter;
detecting an available backup interface to the node;
suspending the primary interface to the node; and
switching routing to the backup interface.

10. The method of claim 9, wherein the threshold parameter further indicates a number of routing attempts.

11. The method of claim 10, wherein the first step of detecting further comprises:
detecting a futile neighbor state loop during adjacency formation to the node via the primary interface by detecting the pattern of link states in the threshold parameter and a number of routing attempts that has reached the threshold parameter.

12. The method of claim 11, wherein the first step of detecting further comprises:
displaying a message indicating that a futile neighbor state loop has been detected in the primary interface to the node.

13. The method of claim 12, wherein the second step of detecting further comprises:
displaying a message indicating that an available backup interface to the node has been detected.

14. A computer hardware system for detecting and managing a futile neighbor state loop during link state routing, comprising:
a memory; and
at least one processor, the at least one processor configured to
read a threshold parameter for link state routing, wherein the threshold parameter indicates a number of routing attempts;
perform link state routing to a node via a primary interface;
detect a futile neighbor state loop during link state routing to the node via the primary interface by detecting a number of routing attempts that has reached the threshold parameter;
detect an available backup interface to the node;
suspend the primary interface to the node; and
switch routing to the backup interface, wherein the threshold parameter further indicates a pattern of link states.

15. The computer hardware system of claim 14 wherein
the futile neighbor state loop is detected by detecting a number of routing attempts that has reached the threshold parameter and by detecting a pattern of link states.

16. The computer hardware system of claim 15, wherein the at least one processor is further configured to:
display a message indicating that a futile neighbor state loop has been detected in the primary interface to the node.

17. The computer hardware system of claim 16, wherein the at least one processor is further configured to:
display a message indicating that an available backup interface to the node has been detected.

* * * * *